Sept. 22, 1959 D. G. OLSON 2,905,114
PROTECTIVE COVER
Filed Dec. 16, 1955 2 Sheets-Sheet 1
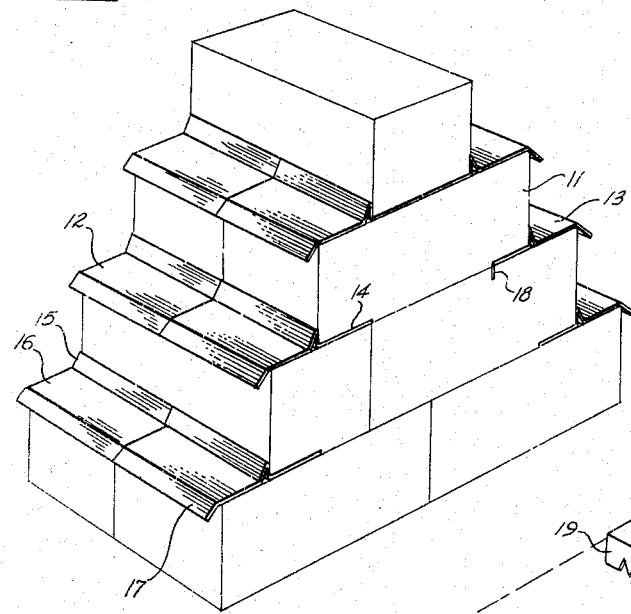
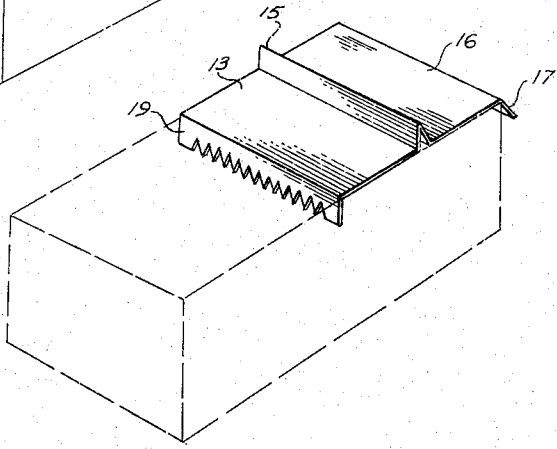
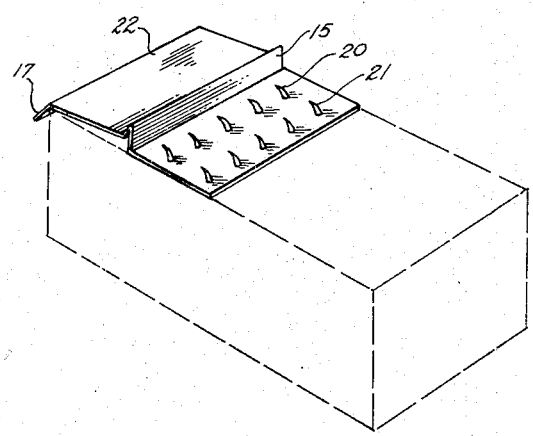
INVENTOR.
DON G. OLSON
BY
Flournoy Corey
ATTORNEY.

Sept. 22, 1959 — D. G. OLSON — 2,905,114
PROTECTIVE COVER
Filed Dec. 16, 1955 — 2 Sheets-Sheet 2
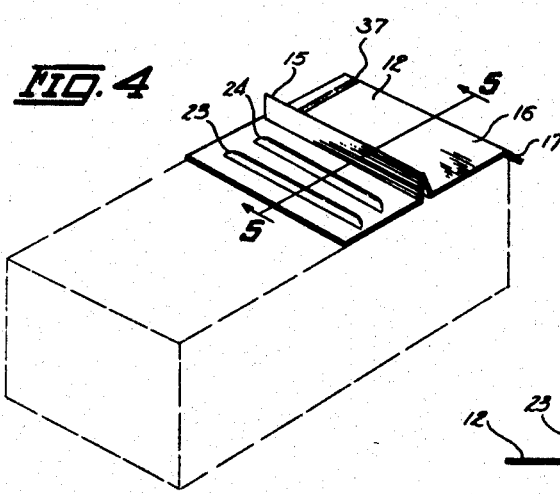
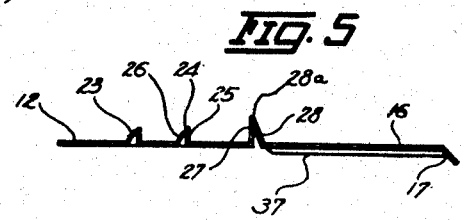
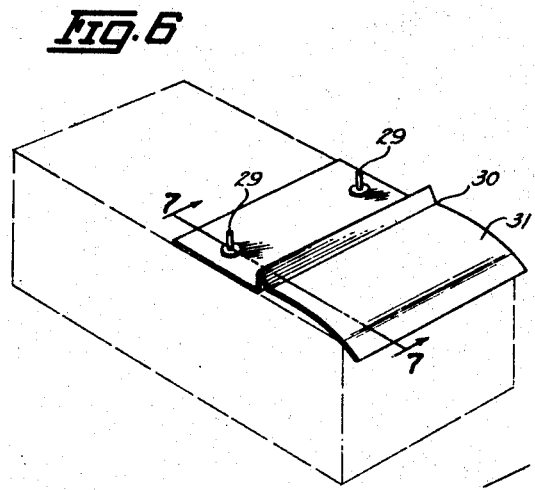
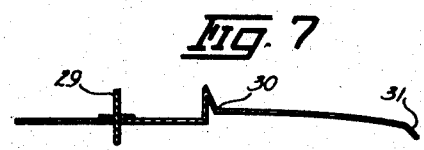
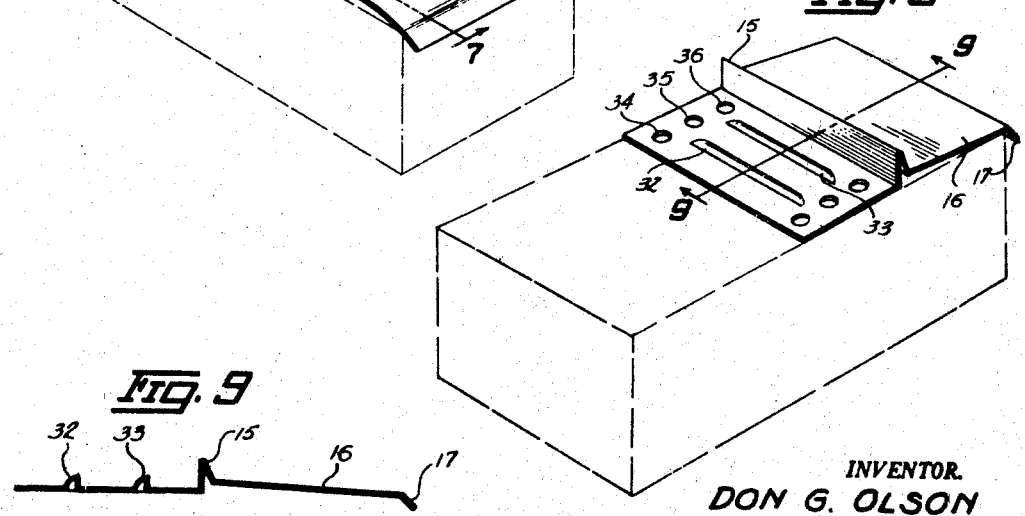
INVENTOR.
DON G. OLSON
BY Flournoy Corey
ATTORNEY ary pin and the outer portion formed with a curved surface.

Figure 7 is a view in cross section of the embodiment of the invention as shown in Figure 6.

Figure 8 is a view in perspective of yet another embodiment of my invention in which openings are provided in addition to the slots, and Figure 9 is a view in cross section of the device as shown in Figure 8 showing the angular shingle portion.

Referring now to the drawings, and more particularly to Figure 1: As has been previously stated, it is common practice to bale hay in rectangular bales, these bales being stacked one on top of another, as shown at 11 in Figure 1. It is this stack and the protection of the hay with which the applicant's invention is concerned. A plurality of covers, comprising metal shields such as 12 and 13, are provided. These shields are laid on the bales at the outermost edge of the stack, as it is raised. Each shield comprises four primary projections. The inner flange 14, which is so positioned on the bale that the next bale may be laid on top of it, is held in position by the weight of the upper bale.

The second portion of the protective shield includes an upwardly projecting channel-like ridge member 15, which serves to prevent the outward movement of the upper bale and to deflect the water outwardly away from this bale. The third portion of the protective shield is a flat surface 16, which acts as a shingle to prevent water from penetrating into the lowermost bales, and the fourth portion 17 is an outwardly and downwardly extending eave which tends to prevent moisture from coming in direct contact with the outward vertical side of the lowermost bale.

Referring now to the individual figures and to the embodiment of my invention shown therein; it will be understood that it is desirable that some positive locking means be provided on the inner flange which is positioned between the upper and lower bale to prevent the shield from being inadvertently drawn outwardly. In the embodiment shown in Figure 2, this locking member consists of the downwardly extending flange 18. This flange may be positioned in such a manner as to overlap the inner wall of the lower bale, or it may alternatively be formed with the serrated edge, such as shown at 19 of Figure 2, in which a flange would be positioned such that these serrated portions would impale themselves upon the upper surface of the lower bale.

Referring now to Figure 3; it will be noted that the locking device disclosed comprises a plurality of inwardly extending spikes 20 and 21 which are curved in such a manner as to function as hooks. It will also be noted, in this embodiment, that the outer portion of the shield 22 is at a slight angle to the horizontal to cause water to drain outwardly away from the upper bale.

In Figure 4 the locking portion comprises a plurality of upwardly extending ridges 23 and 24. It is to be noted, in this connection, that the outward wall 25 is vertical, while the inner wall 26 slopes angularly in relation to the vertical.

It is also to be noted that in all forms of the device herein disclosed, the center ridge or shelf 28a, which is formed to extend the length of the shield, has one vertical inner wall 27 and an outwardly, downwardly extending angular wall 28. It will be at once apparent that the top bale rests in the 90 degree angle formed by the inner wall and the shield surface, and that the angular wall will tend to direct water away from this upper bale and eliminate the possibility of standing water seeping in between the adjacent upper and lower bales.

In Figure 6 another embodiment of my invention is disclosed in which the locking means comprises a remov-

---

2,905,114

PROTECTIVE COVER

Don G. Olson, Nebraska City, Nebr.

Application December 16, 1955, Serial No. 553,498

8 Claims. (Cl. 108—3)

This invention relates to a protective cover and more particularly to one which can be used to cover baled hay as it is stacked in the field.

It is a well known fact that the majority of the hay cut is immediately baled, particularly into rectangular bundles which are tied and stacked one on top of the other in the open field for storage.

Of course hay stacked in this manner suffers from the ravages of the weather, and more particularly from the effects of rain and snow. Moisture penetrating the stacks of hay to any depth causes the mildewing and rotting of the hay. This is particularly true of baled hay because moisture is able to run down between the individual bales and thus penetrate deeply into the stack, which is not necessarily the case in the loosely stacked hay.

It is therefore a primary object of my invention to provide a plurality of protective covers which may be laid on top of the outermost and uppermost bales as they are stacked, the shield acting to prevent moisture in the form of rain or snow from penetrating the stack.

It is still a further object of my invention to provide a cover which is firmly held in position by the weight of bales of hay in the stacks.

It is yet another object of my invention to provide a cover which includes a deflector portion which tends to direct the run-off water away from the stacked hay.

It is still another object of my invention to provide a protective cover of such a size that a plurality of them may be incorporated into the stack and overlapped as the bales are placed into position individually.

Other and further features and objects of the invention will be more apparent to those skilled in the art upon a consideration of the accompanying drawings and following specifications, wherein are disclosed several exemplary embodiments of the invention, with the understanding, however, that such changes may be made therein as fall within the scope of the appended claims, without departing from the spirit of the invention.

In said drawings:

Figure 1 is a perspective view of a stack of bales in staggered relation, showing the covers in position on the bales.

Figure 2 is a perspective view of one embodiment of my invention in which the inner portions of the covers carry a downwardly depending flange.

Figure 3 is a perspective view of another embodiment of my invention in which the inner flange carries the upwardly extending hook projections adapted to receive and support the bale of hay.

Figure 4 is a perspective view of yet another embodiment of my invention in which the inner portion of the protective cover incorporates a plurality of rigid locking portions.

Figure 5 is a view in cross section of the device shown in Figure 4.

Figure 6 is a perspective view of yet another embodiment of my invention in which the inner portion carries able vertical pin 29, which is positioned in the shield surface on the inner flange. It is also to be noted, in this embodiment, that the outer shelf is formed in an arc, the highermost portion of the arc being on the inner edge at 30, and the shield sloping downwardly from that point to the overhanging eave 31. Again the purpose of such a structure is to carry water away from the uppermost bales.

In Figure 8 yet another embodiment is disclosed in which the locking portion includes longitudinal louvers 32 and 33 and a plurality of holes, such as 34, 35 and 36, at both ends of the shield.

It will be understood that the shields may be of any length, but it is preferable that their length be based upon the standard bale sizes—that is, that they be either the length of one bale, or two bales, with sufficient excess that they may be overlapped to shield the joints between bales. Of course they can be two or three times the length of a single bale, so long as a modulator relationship is maintained. It will be apparent that the primary purpose of maintaining such a relationship is to facilitate easy stacking in that a fixed number of shields will cover a fixed number of bales.

It will be seen, from the foregoing, that I have provided a device of sufficient flexibility as to be incorporated in stacks of baled hay as they are built and to be firmly locked into position in the stack; further, that a plurality of such shields incorporated in the stack as it is constructed, will provide a complete continuous cover for the stack and hold the penetration of moisture to a minimum.

In use, the plurality of covers would be placed in side-by-side overlapping relation. To assure proper drainage at the joints and to carry water outwardly from the ridge, each shingle may be provided with an outwardly extending trough or depressed portion 37 on one side. The next shingle would be laid over the slot.

Although I have described several specific embodiments of my invention, it is apparent that modifications thereof may be made by those skilled in the art. Such modifications may be made without departing from the spirit and scope of my invention as set forth in the appended claims.

I claim as my invention:

1. In a protective shield adapted to be positioned between bales of hay or the like which are stacked in pyramidal form in relation one to the other, said shield being interleaved between the bales as one bale is stacked on top of another, said shield comprising an inner flange adapted to be positioned on top of the lowermost bale and beneath the uppermost bale, an upwardly extending ridge portion formed adjacent one edge of said flange portion and having one vertically extending wall adjacent said flange and a second wall extending outwardly and angularly downwardly in relation to the upper edge of said vertically extending wall, and a shingle portion integral with and adjacent to the lowermost portion thereof said angular wall of said ridge and extending outwardly therefrom, terminating in a downwardly and outwardly projecting eave, the aforementioned vertical inner ridge wall being such that it may be positioned adjacent the vertical wall of the upper bale to cause water to be diverted away from said inner flange and said bale and the shingle and eave being such that they may be positioned above and extended outwardly from the lower portion of said angular wall over said lower bale to cause said diverted water to be further diverted outwardly and away from the lower bale.

2. In a device as set forth in claim 1, said inner flange including a downwardly projecting secondary flange adapted to engage the lowermost bale and lock said protective shield thereto.

3. In a device as set forth in claim 2, the downwardly projecting flange portion being serrated to prevent sideward motion.

4. A device as set forth in claim 1, the inwardly extending flange having longitudinal louvers therein adapted to hold said protective shield in a fixed position between said bale.

5. In a device as set forth in claim 4, said inner flange having openings therein in addition to said longitudinal louvers.

6. In a device as set forth in claim 1, outwardly, upwardly extending hooked portions in said inner flange adapted to hold said protective shield in position in relation to the aforementioned upper and lower bales.

7. In a device as set forth in claim 1, said shingle portion being angularly disposed in relation to said inner flange to cause water and the like to run outwardly from said flange portion.

8. In a device as set forth in claim 1, said shingle portion being curved downwardly away from said inner flange portion to cause water and the like to drain in an outwardly direction.

References Cited in the file of this patent

UNITED STATES PATENTS

| | | |
|---|---|---|
| 2,086,794 | Fradette | July 13, 1937 |
| 2,140,407 | Schilling | Dec. 13, 1938 |
| 2,421,978 | Andrews | June 10, 1947 |
| 2,743,825 | Koehler | May 1, 1956 |